United States Patent
Kalhan et al.

(10) Patent No.: US 10,314,093 B2
(45) Date of Patent: Jun. 4, 2019

(54) SELECTION BETWEEN CELLULAR COMMUNICATION LINK AND DEVICE-TO-DEVICE (D2D) COMMUNICATION LINK FOR COMMUNICATION BETWEEN USER EQUIPMENT (UE) DEVICES

(71) Applicants: Kyocera Corporation, Kyoto (JP); Amit Kalhan, San Diego, CA (US); Henry Chang, San Diego, CA (US)

(72) Inventors: Amit Kalhan, San Diego, CA (US); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 307 days.

(21) Appl. No.: 15/311,807

(22) PCT Filed: Jun. 9, 2015

(86) PCT No.: PCT/US2015/034912
§ 371 (c)(1),
(2) Date: Nov. 16, 2016

(87) PCT Pub. No.: WO2015/191586
PCT Pub. Date: Dec. 17, 2015

(65) Prior Publication Data
US 2017/0099689 A1    Apr. 6, 2017

Related U.S. Application Data

(60) Provisional application No. 62/011,714, filed on Jun. 13, 2014.

(51) Int. Cl.
| | | |
|---|---|---|
| H04W 76/02 | (2009.01) | |
| H04W 76/14 | (2018.01) | |
| H04W 76/10 | (2018.01) | |
| H04W 40/02 | (2009.01) | |
| H04W 40/12 | (2009.01) | |

(Continued)

(52) U.S. Cl.
CPC ........... *H04W 76/14* (2018.02); *H04W 40/02* (2013.01); *H04W 40/12* (2013.01); *H04W 48/16* (2013.01);
(Continued)

(58) Field of Classification Search
CPC ..... H04W 76/14; H04W 76/10; H04W 40/02; H04W 40/12; H04W 48/16; H04W 48/18; H04W 52/34; H04W 72/04
See application file for complete search history.

(56) References Cited

U.S. PATENT DOCUMENTS

2009/0011778 A1    1/2009   Jung et al.
2011/0275382 A1    11/2011  Hakola et al.
(Continued)

FOREIGN PATENT DOCUMENTS

JP    2009-017559 A    1/2009
WO   WO2012-147479 A1  11/2012

OTHER PUBLICATIONS

Chen Xu, Lingyang Song, & Zhu Han; "Resource Management for Device-to-Device Underlay Communication"; arXiv.1311.1018v1; Nov. 5, 2013; (https://arxiv.org/pdf/1311.1018v1).

*Primary Examiner* — Melvin C Marcelo (57) ABSTRACT

A transmitting user equipment (UE) device selects between a cellular communication link and a device-to-device (D2D) communication link for transmission for data from the transmitting UE device to a receiving UE device. Based on cellular channel characteristic information and D2D channel characteristic information, the UE device selects between the cellular communication link and the D2D communication link. The cellular channel characteristic information is indicative of at least a portion of a cellular communication link through a base station (eNB) and the D2D channel characteristic information is indicative of the D2D commu- (Continued)

nication link between the transmitting UE device and the receiving UE device.

16 Claims, 4 Drawing Sheets (51) Int. Cl.
*H04W 48/16* (2009.01)
*H04W 48/18* (2009.01)
*H04W 52/34* (2009.01)
*H04W 72/04* (2009.01)
*H04W 48/20* (2009.01)

(52) U.S. Cl.
CPC ........... *H04W 48/18* (2013.01); *H04W 52/34* (2013.01); *H04W 72/04* (2013.01); *H04W 76/10* (2018.02); *H04W 48/20* (2013.01); *Y02D 70/00* (2018.01); *Y02D 70/1262* (2018.01); *Y02D 70/21* (2018.01); *Y02D 70/30* (2018.01); *Y02D 70/34* (2018.01)

(56) References Cited

U.S. PATENT DOCUMENTS

| | | |
|---|---|---|
| 2012/0184306 A1 | 7/2012 | Zou et al. |
| 2013/0195026 A1 | 8/2013 | Johnsson et al. |
| 2013/0315182 A1 | 11/2013 | Kitou et al. |
| 2014/0105178 A1 | 4/2014 | Jang et al. |
| 2016/0173180 A1* | 6/2016 | Cheng ................. H04B 7/0469 375/267 |

* cited by examiner

SELECTION BETWEEN CELLULAR COMMUNICATION LINK AND DEVICE-TO-DEVICE (D2D) COMMUNICATION LINK FOR COMMUNICATION BETWEEN USER EQUIPMENT (UE) DEVICES

CLAIM OF PRIORITY

The present application claims priority to Provisional Application No. 62/011,714 entitled "Network-Assisted D2D User Equipment Transmit Request Signaling," filed Jun. 12, 2014, assigned to the assignee hereof and hereby expressly incorporated by reference in its entirety.

FIELD

This invention generally relates to wireless communications and more particularly to selection between a cellular link and a (device-to-device) D2D link for communication between user equipment (UE) devices.

BACKGROUND

Many wireless communication systems use base stations to provide geographical service areas where wireless communication user equipment (UE) devices communicate with the base station (evolved Node B, eNB) providing the particular geographical service area in which the wireless communication UE devices are located. The base stations are connected within a network allowing communication links to be made between the wireless communication devices and other devices. In some situations, the communication links may be between UE devices within the service area of a base station. A cellular communication link between the UE devices includes communication through the base station providing the service. Where channel quality is sufficient, the UE devices can communicate directly through a device-to-device (D2D) communication link that does not include routing data through the base station. Some situations, it may be preferred to have a direct D2D communication link between the two UE devices rather than communicating through a base station.

SUMMARY

A transmitting user equipment (UE) device selects between a cellular communication link and a device-to-device (D2D) communication link for transmission for data from the transmitting UE device to a receiving UE device. Based on cellular channel characteristic information and D2D channel characteristic information, the UE device selects between the cellular communication link and the D2D communication link. The cellular channel characteristic information is indicative of at least a portion of a cellular communication link through a base station (eNB) and the D2D channel characteristic information is indicative of the D2D communication link between the transmitting UE device and the receiving UE device.

DETAILED DESCRIPTION

Figure 1:
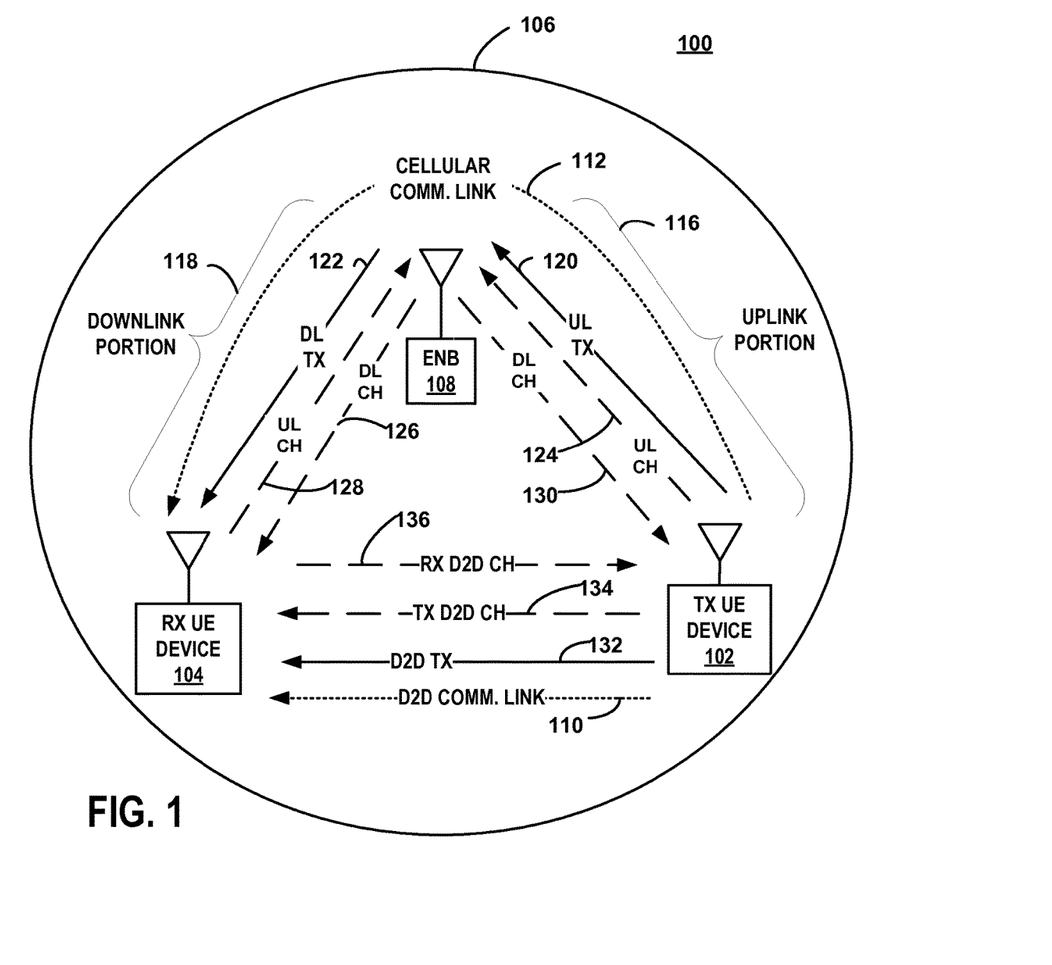
FIG. 1 is a block diagram of cellular communication system that supports device-to-device (D2D) communication where a transmitting user equipment (UE) device selects a communication transmission link for transmitting data to a receiving UE device.

FIG. 1 is a block diagram of cellular communication system 100 that supports device-to-device (D2D) communication where a transmitting user equipment (UE) device 102 selects a communication transmission link for transmitting data to a receiving UE device 104. The two UE devices 102, 104 are referred to herein as "transmitting UE device" and "receiving UE device", respectively because of the particular direction of the data transmission in the example. The receiving UE device 104 can also transmit data as well as control signals to the transmitting UE device 102 in transmissions at other times. As a result, the roles of the two UE devices 102, 104 may be reversed at certain times. For the example of FIG. 1, the transmitting UE device 102 and the receiving UE device 104 are within the geographic service area 106 provided by a base station (eNB) 108 and are capable of communicating over a D2D link. In other words, the channel conditions are adequate for supporting D2D communication although it may not be the preferred link. Accordingly, a D2D communication link 110, as well as a cellular communication link 112, can be established for transmission of data between the transmitting UE device and 102 the receiving UE device 104. The D2D communication link 110 is a direct wireless communication link between the transmitting UE device 102 and the receiving UE device 104 that does not route data through the base station (eNB) 108. The cellular communication link 112 includes at least an uplink portion 116 from the transmitting UE device 102 to the base station (eNB) 108 and a downlink portion 118 from the base station (eNB) 108 to the receiving UE device 104. Therefore, sending data from the transmitting UE device 102 to the receiving UE device 104, includes an uplink transmission 120 and a downlink transmission 122. The uplink transmission 120 is transmitted in the uplink portion 116 over one or more uplink channels 124. The base station 108 transits the downlink transmission 122 to the receiving UE device 102 over one or more downlink channels 126. The base station 108 can also transmit downlink signals to the transmitting UE device 102 over downlink channels 128 and receive uplink signals from the receiving UE device over uplink channels 130.

Sending the data from the transmitting UE device 102 to the receiving UE device 104 over the D2D communication link 110 includes a D2D transmission 132 over one or more D2D transmission channels 134. The transmitting UE device can also receive signals from the receiving UE device 104 over D2D reception channels 136. One or more of the D2D transmission channels 134 can be the same as the D2D reception channels 136. For the examples herein, the D2D channels 134, 136 are a subset of cellular uplink channels. In some cases, downlink channels can be used.

The transmitting UE device 102 selects either the cellular communication link 112 or the D2D communication link 110 for transmission of data based on at least cellular channel characteristic information and D2D channel characteristic information indicative of the D2D communication link. The cellular channel characteristic information is indicative of at least a portion of the cellular communication link 112. For example, the cellular channel characteristic information may be related only to uplink portion 116, only the downlink portion 118 or to both the uplink and downlink portions. The channel characteristic information may be channel quality measurements in one or both directions of the link (or portion of link), may be a calculation based on such measurements, or may be combinations of measurements and calculations. In one example, as discussed below, the cellular channel characteristic information may be an indicator of whether the channel quality indicator of the uplink portion of the cellular communication link is above a threshold, where the channel quality indicator is based on measurements of signals transmitted from the transmitting UE device in the uplink portion. The channel characteristic information may also be indicative of the transmission power required for the transmitting UE device 102 to transmit data through the channel. The techniques described herein have advantages over techniques where the base station (eNB) selects the communication link for the transmitting UE device. For example, techniques where the UE device selects the link require less signaling than techniques where the base station selects the communication link since the UE device must report information regarding the D2D communication link. For the examples herein, the UE device does not need to forward D2D channel information to the base station. In addition, as discussed below, the UE device may determine the cellular channel characteristics without specific information being provided by the base station. For example, reciprocity can be used in some situations especially where TDD is employed in the cellular link. Other techniques include evaluating power control parameters and other transmission access processes.

The base station (eNB) 108 provides wireless communication services to wireless communication user equipment (UE) devices 102, 104 within the geographical service area 106, sometimes referred to as a cell. Several base stations are typically interconnected through a backhaul (not shown) to provide several service areas to cover large areas. Other system components forming system entities and performing system functions such as Mobility Management Entity (MME), scheduling, gateway and other functions are omitted from FIG. 1 in the interest of brevity and clarity. Any description with reference FIG. 1 of the various functions and operations of such equipment may be implemented in any number of devices, circuits, or elements. Two or more functional blocks may be integrated in a single device, and the functions described as performed in any single device may be implemented over several devices in some circumstances. A cellular communication system is typically required to adhere to a communication standard or specification. The Third-Generation Partnership Project Long-Term Evolution (3GPP LTE) communication specification is a specification for systems where base stations (eNodeBs) provide service to wireless communication devices (user equipment (UE) devices) using orthogonal frequency-division multiplexing (OFDM) on the downlink and single-carrier frequency-division multiple access (SC-FDMA) on the uplink. Although the techniques described herein may be applied in other types of communication systems, the exemplary systems discussed herein operate in accordance with at least one revision of the 3GPP LTE communication specification.

The base station (eNB) 108 is a fixed transceiver station, sometimes referred to as an evolved Node B, eNodeB or eNB, which may include a controller in some circumstances. The base station 108 may be connected to a controller through a backhaul which may include any combination of wired, optical, and/or wireless communication channels. The controller may include the functionality of the Mobility Management Entity (MME) and the Packet Gateway (P-GW) in a 3GPP LTE communication system.

The wireless (UE) communication devices (UE devices) 102, 104 may be referred to as mobile devices, wireless devices, wireless communication devices, mobile wireless devices, user equipment, UEs, UE devices as well as by other terms. The UE devices 102, 104 include electronics and code for communicating with base stations and with other wireless communication devices in D2D configurations. The UE devices may include devices such as cell phones, personal digital assistants (PDAs), wireless modem cards, wireless modems, televisions with wireless communication electronics, and laptop and desktop computers as well as other devices. The combination of wireless communication electronics with an electronic device, therefore, may form a UE device 102, 104. For example, a UE device may include a wireless modem connected to an appliance, computer, or television.

The base station 108 includes a wireless transceiver that exchanges wireless signals with the UE devices 102, 104. Transmissions from the base stations and from the UE devices 102, 104 are governed by a communication specification that defines signaling, protocols, and parameters of the transmission. The communication specification may provide strict rules for communication and may also provide general requirements where specific implementations may vary while still adhering to the communication specification. Although the discussion below is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical downlink control channels from a base station to a UE device.

As discussed above, the transmitting UE device 102 selects a preferred transmission link from the cellular communication link 112 and the D2D communication link 110 based on channel characteristic information. The channel characteristic information may be determined by another entity (e.g., receiving UE device, base station) and provided to the transmitting device or may be determined by the transmitting UE device 102. Some examples of the techniques of obtaining the cellular channel characteristic information are discussed below.

Base Station Determined Cellular Channel Characteristic Information

In some situations, the base station (eNB) 108 determines the cellular channel characteristic information and forwards the information to the transmitting UE device 102. The cellular channel characteristic information determined by the base station 108 may include various types of information and formats. In one example, the base station measures, or otherwise evaluates, uplink signals transmitted from the transmitting UE device through the uplink channel 124. For the example, conventional techniques using the 3GPP LTE systems are used to determine uplink channel state information (CSI) for the uplink channel 124. The actual uplink CSI parameters may be sent to the transmitting UE device 102. In some situations, however, the cellular channel characteristic information sent to the transmitting UE device 102 may be information based on the CSI parameters. For example, the cellular channel characteristic information sent to the transmitting UE device may be an indication of whether the quality of the uplink channel 124 exceeds a minimum threshold (or is below a threshold). The base station 108 may also measure or determine channel characteristics of the downlink channel 126 to the receiving UE device (i.e., determine the quality of the downlink portion 118). The downlink channel characteristics may be determined by feedback received from the receiving UE device or may be determined by measuring the uplink channel 128 and applying reciprocity to determine the characteristics of the downlink channel 126. In many situations, the channel characteristics of the downlink channel 126 to the receiving UE device are not determined and/or are not sent to the transmitting UE device 102 because downlink channels typically have better quality than uplink channels. Base stations are typically not limited in transmission power and employ multiple antennas which generally results in more robust channels in the downlink than the uplink. In situations where the downlink channel characteristics are determined, the cellular channel characteristic information sent to the transmitting UE device 102 may include only information regarding the lower quality portion of the cellular communication link. In other words, the uplink channel 124 and the downlink channel 126 characteristic are evaluated and information regarding the channel with the lower quality is provided to the transmitting UE device 102. Where the base station 108 reports information regarding the downlink channel 126, the base station 108 may report an indication of whether the quality of the channel is above or below a threshold.

The transmission of cellular communication channel characteristics from the base station to the UE device may be periodic, in response to a trigger event, or in response to a request from the transmitting UE device. Examples of trigger events include changes in measurements (e.g., quality of channel falls below threshold), changes in system events, and the need for the UE device to send data or a request.

UE Device Determined Cellular Communication Channel Characteristic Information

In some situations, the transmitting UE device 102 determines at least some cellular communication channel characteristics. One technique includes determining the cellular communication channel characteristics of the uplink portion 116 of the cellular communication link 112 using reciprocity. Such a technique is most advantageous in time division duplex (TDD) communication where the transmitting UE device receives signals from the base station at the same frequencies used for transmitting signals to the base station. The transmitting UE device 102 can evaluate reference signals transmitted from the base station 108 or use other techniques to determine the channel characteristic including the quality of the downlink channel 130. The UE device 102 determines the channel characteristics to be the same in the uplink channel 124. Although reciprocity may be used during frequency division duplex (FDD) operation in some situation, results are typically less reliable since channel characteristics are likely to vary over frequency. However, the accuracy of such a technique in FDD is directly correlated to the difference in frequency of the uplink and downlink channel. If the uplink channel frequency is near the downlink channel frequency, the channel characteristics of the two directions are likely to be similar. As a result, a downlink measurement is more likely to provide an accurate assessment of the uplink channel.

In another technique, the transmitting UE device 102 determines the channel characteristic information by determining a transmission power based on power control parameters. The power control parameters may be based on open loop or closed loop power control techniques. Based on power control parameters, the transmitting UE device 102 determines the transmission power required to transmit signals to the base station 108. Such channel characteristic information can be compared to the transmit power level required to reach the receiving UE device 104 over the D2D communication link 110 when selecting the transmission link (path).

The transmitting UE device may also determine transmission power required to transmit signals to the base station based on the Physical Random Access Channel (PRACH) transmission access process used in LTE systems. During such a procedure the UE device transmits a series of transmissions with incremental increases in transmission power in each transmission. When the UE device receives a response, it assumes the transmission power needed to reach the eNB is equal to the last the transmit power of the last transmission. Therefore, the cellular channel characteristic information determined for this technique is transmission power.

Since the transmitting UE device 102 only interfaces with the base station 108 through the uplink portion 116, the transmitting UE device 102 cannot typically determine the cellular channel characteristic information of the downlink portion 118 between the base station and the receiving UE device 104. In situations where information regarding the downlink portion 118 is provided to the transmitting UE device 102, the device 102 may determine some cellular channel characteristic information regarding the downlink portion 118. For example, the receiving UE device 104 may provide the transmitting UE device 108 with downlink channel measurements that allow the transmitting UE device 102 to determine the channel characteristics of the downlink portion. Such a technique may also be viewed as an example where the receiving UE device provides cellular channel characteristics information to the transmitting UE device.

D2D Channel Characteristic Information

In addition to obtaining the cellular communication channel characteristic information, the transmitting UE device obtains D2D channel characteristic information. The transmitting UE device 102 determines the D2D channel characteristic information based on signals received from the receiving UE device 104. In some situations, the transmitting UE device measures, or otherwise evaluates, signals transmitted by the receiving UE device 104 to determine the D2D channel characteristic information. In other situations, the transmitting UE device 102 receives information from the receiving UE device 104 that allows the transmitting UE device to determine the D2D channel characteristic information.

Where the transmitting UE device 102 measures signals to determine the D2D channel characteristic information, the transmitting UE device may evaluate any of several signals transmitted from the receiving UE device. One example includes measuring or evaluating a D2D discovery signal or reference signal. Other signals, such as communication signals and controls signals can also be evaluated to determine the characteristics of the D2D reception channel 136. Reciprocity can then be applied to determine the channel characteristics of the D2D transmission channel 134, especially where the D2D communication is TDD.

In some situations, the transmitting UE device 102 can evaluate information provided by the receiving UE device 104 to determine the D2D channel characteristic information. For example, the receiving UE device 104 may measure signals transmitted by the transmitting UE device and provide the measurements to the transmitting UE device 102. In addition, power control information received from the receiving UE device 104 can be evaluated by the transmitting UE device 102 to determine the required transmission power for transmitting data through the transmission D2D channel 134. Also, a technique can be employed where the transmitting UE device transmits a series of transmissions with incremental increases in transmission power in each transmission to the receiving UE device. When the transmitting UE device receives a response, it assumes the transmit power needed to reach the receiving UE device is equal to the last transmit power of the last transmission. Such techniques, however, may not be preferred in some situations because of significant overhead.

Regardless of how the transmitting UE device 102 obtains the cellular communication channel characteristic information and the D2D channel characteristic information, the transmitting UE device 102 evaluates the information to select the transmission link for data to be sent to the receiving UE device 104. For the examples herein, the transmitting UE device 102 compares the cellular communication channel characteristic information to D2D communication channel characteristic information that is determined by the transmitting UE device 102. Selection between the cellular communication link 112 and the D2D communication link 110 may be performed in a variety of different ways and typically depends on the type of channel information that has been obtained as well as other factors. The quality of the two links 110, 112 may be compared in some circumstances. An example of suitable transmission link selection process includes comparing the transmission power required to transmit an uplink signal to the base station to the transmission power required to transmit a D2D signal to the receiving UE device and selecting the link that requires less transmission power. In some situations, the selection of the transmission link may be based on factors in addition to the channel characteristics. For example, where the UE devices 102, 104 are being used for public safety, the transmitting UE device may select the D2D communication link even where greater power may be needed for the D2D transmission than for an uplink cellular transmission. Such a selection may be based on the need to maintain communication when one or both of the UE devices leave the service area of the eNB.

In some situations, the evaluation of factors and selection of the preferred link is based on other information in addition to the channel characteristic information of the two links. For example, where a particular quality of service (QoS) is required (e.g. video streaming), the selection of the link may be based on the ability of the links to provide the minimum QoS.

After selecting a transmission link from the two links (cellular communication link and D2D communication link), the UE device sends a request for the selected transmission link to the base station 108. For the examples herein, if the transmitting UE device 102 selects the cellular communication link for transmitting the data to the receiving UE device, the transmitting UE device transmits signaling in accordance with LTE communication standards to acquire the cellular resources required to establish the cellular communication link.

Figure 2:
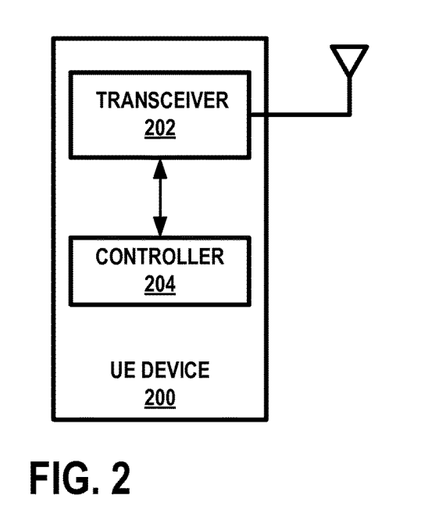
FIG. 2 is a block diagram of an example of a UE device suitable for use as one of the UE devices in FIG. 1.

If the transmitting UE device selects the D2D communication link for transmitting the data to the receiving UE device, the transmitting UE device transmits a control signaling requesting a D2D communication resources to transmit the data to the receiving UE device. For the examples herein, if the transmitting UE device 102 selects the D2D communication link for transmitting the data to the receiving UE device, the transmitting UE device transmits signaling in accordance with LTE communication standards to acquire the D2D resources required to establish the D2D communication link. After receiving a grant for the requested resources, the transmitting UE device transmits the data to the receiving UE device over the selected link.

Where the transmitting UE device maintains separate buffers for cellular and D2D, the transmitting UE device may combine data from multiple buffers and destined to the receiving UE device into the buffer of the selected link before sending a Buffer Status Report (BSR) to the base station FIG. 2 is a block diagram of an example of a UE device 200 suitable for use as one of the UE devices 102, 104 in FIG. 1. The UE device 200 includes a transceiver 202 and a controller 204, as well as other components and circuitry (not shown) such as memory and a user interface, for example.

The transceiver 202 includes a transmitter that transmits uplink wireless signals to base stations (eNBs) and a receiver that receives downlink wireless signals from base stations (eNBs) over the uplink and downlink channels, respectively. The transceiver 202 can also be configured to transmit and receive D2D signals using allocated cellular resources, such as uplink communication resources, for example. The controller 204 controls components of the UE device 200 to manage the functions of the device 200 described herein as well as to facilitate the overall functionality of the device 200. The controller 204 is connected to the transceiver 202 and other components such as memory.

The receiver in the transceiver 202 may also used to measure parameters to determine channel characteristics for the downlink channel and the D2D channels. For the examples, the controller and the receiver measure one or more parameters that indicate channel characteristics such as the quality of the channel or the required transmission power for transmission through the channel.

Figure 3:
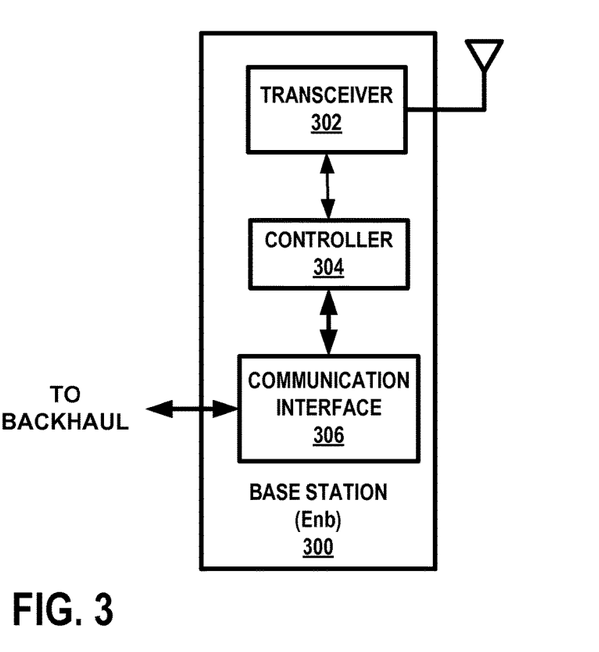
FIG. 3 is a block diagram of an example of an a base station (eNB) suitable for use as the base station (eNB) in FIG. 1.

FIG. 3 is a block diagram of an example of a base station (eNB) 300 suitable for use as the base station (eNB) 108 in FIG. 1. The base station (eNB) 300 includes a transceiver 302, a controller 304, and a communication interface 306 as well as other components and circuitry (not shown) such as memory, for example.

The transceiver 302 exchanges wireless signals with the UE devices 104, 106 within the service area 106. Transmissions from the base station (eNB) and from the UE devices are governed by a communication specification that defines signaling, protocols, and parameters of the transmission. The communication specification may provide strict rules for communication and may also provide general requirements where specific implementations may vary while still adhering to the communication specification. Although the discussion herein is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical channels.

The transceiver 302, therefore, includes at least a downlink transmitter for transmitting downlink signals and an uplink receiver for receiving uplink signals. The receiver and controller measure one or more parameters to determine characteristics of the uplink channels. An example of a suitable technique includes determining CSI for the channels.

For the example, the base station (eNB) 300 also includes a communication interface 306 for facilitating communication over the backhaul with other eNBs and network entities. Where X2 signaling is available, the communication interface 312 communicates over the backhaul using X2.

Figure 4:
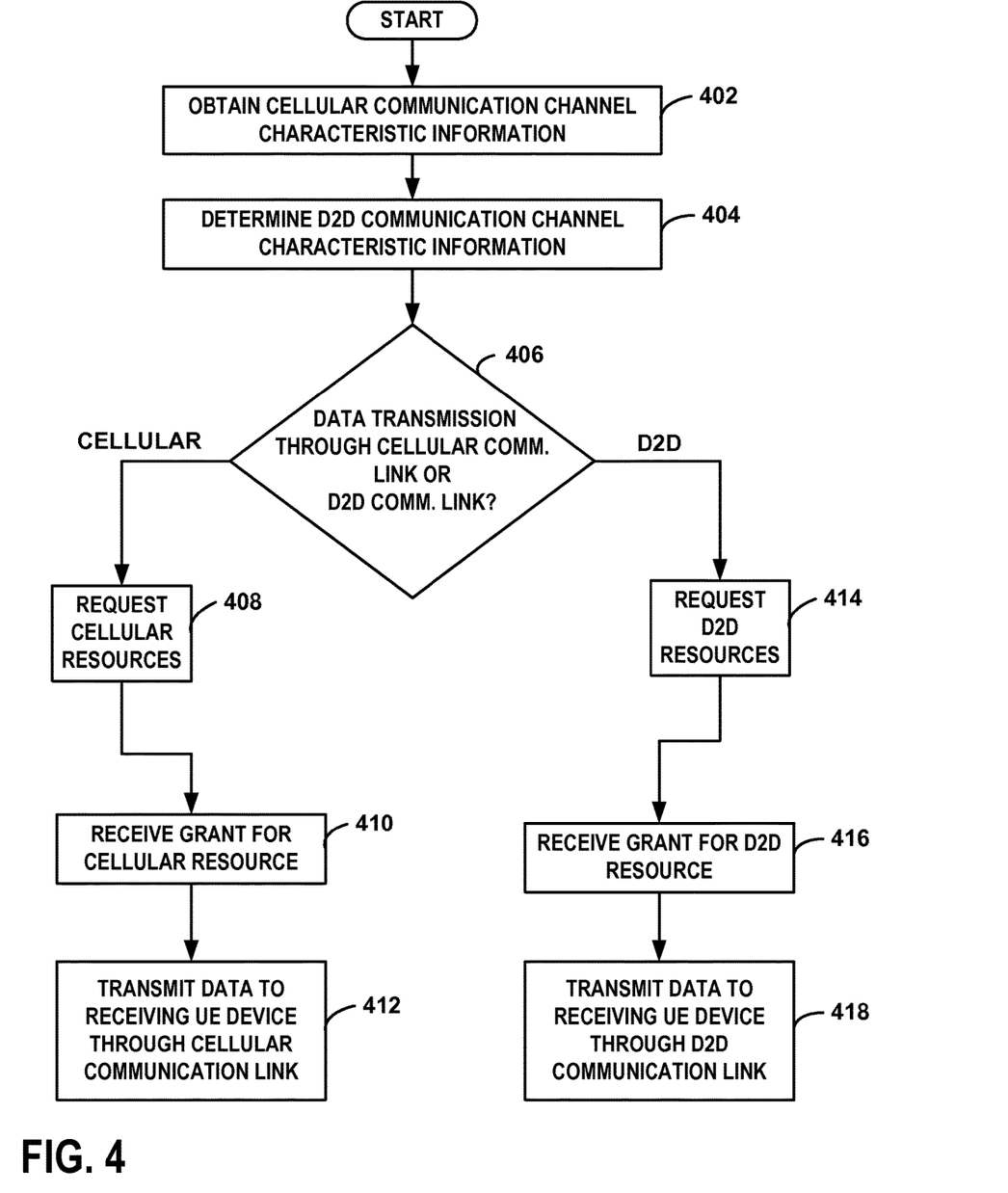
FIG. 4 is a flowchart of an example of a method of selecting a transmission link performed at a transmitting UE device.

FIG. 4 is a flowchart of an example of a method of selecting a transmission link performed at a transmitting UE device 102. For the examples herein, the method is performed by executing code on the controller and utilizing other components of the transmitting UE device 102. The steps of the method may be performed in a different order and some steps may be performed simultaneously in some situations.

At step 402, cellular communication channel characteristics are obtained. As discussed above, the transmitting UE device may receive cellular communication channel characteristics such as CSI reports or may independently determine the communication channel characteristics.

At step 404, D2D communication channel characteristics are obtained. As discussed above, the transmitting UE device may receive D2D communication channel characteristics from the receiving UE device or may independently determine the D2D communication channel characteristics.

At step 406, the transmission link for the data is selected. The transmitting UE device 102 evaluates the cellular communication channel characteristics and the D2D communication channel characteristics and determines the preferred link between the cellular communication link 112 and the D2D communication link 110. In one example, the transiting UE device 102 compares the required transmission power for transmission through the D2D communication link 110 to the required transmission power for transmission through the cellular communication link 112 and selects the link that requires less power. As discussed above, other techniques can be used to select the preferred transmission path. If the cellular communication link 112 is selected, the method continues at step 408. If the D2D communication link 110 is selected, the method continues at step 414.

At step 408, the transmitting UE device 102 requests resources for establishing the cellular communication link to transmit the data. The transmitting UE device, therefore, send a request to the base station (eNB) 108 for uplink cellular resources.

At step 410, the transmitting UE device 102 receives a grant for the requests cellular resources. The grant request is typically sent as a buffer status request mapped to a logical channel ID corresponding to the service intended for the receiving UE device 104. If the grant is not received, the UE device operates in accordance with conventional channel access techniques and may repeat the request for the resources.

A step 412, the transmitting UE device 102 transmits the data to the receiving UE device through the cellular communication link. Using the uplink resources identified in the grant from the base station, the transmitting UE device transmits the data in the uplink channel 124 to the base station 108 which forward the data to the receiving UE device 104 in the downlink channel 126.

At step 414, the transmitting UE device 102 requests resources for establishing the D2D communication link to transmit the data. The transmitting UE device, therefore, sends a request to the base station (eNB) 108 for D2D resources.

At step 416, the transmitting UE device 102 receives a grant for the request for D2D resources. If the grant is not received, the UE device operates in accordance with conventional D2D channel access techniques and may repeat the request for the resources.

A step 418, the transmitting UE device 102 transmits the data to the receiving UE device through the D2D communication link 110. Using the D2D resources identified in the grant from the base station, the transmitting UE device transmits the data to the receiving UE device 104 in the D2D transmission 132.

Figure 5:
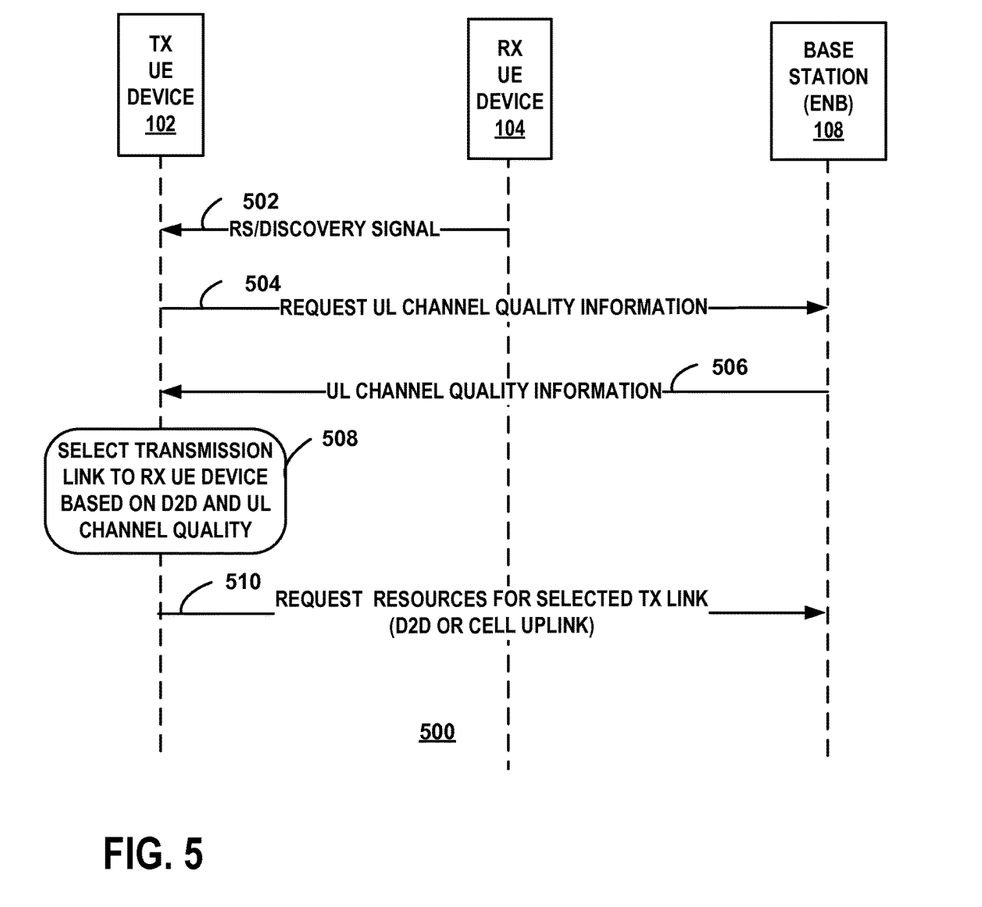
FIG. 5 is a message diagram for an example of selected a transmission link where the transmitting UE device requests uplink channel quality information.

FIG. 5 is a message diagram 500 for an example of selected a transmission link where the transmitting UE device requests uplink channel quality information. The example of FIG. 5, therefore, is one example where the transmitting device receives the cellular channel characteristics information from the base station 108.

At transmission 502, the receiving UE device transmits a reference signal or D2D discovery signal which is received by the transmitting UE device 102. The transmitting UE device evaluates the received signal to determine a channel quality (D2D channel characteristic information) or the D2D communication link. For the example of FIG. 5, the D2D communication uses TDD and, as a result, reciprocity can be applied to determine the channel for the D2D transmission channel 132.

At transmission 504, the transmitting UE device 102 requests uplink channel quality information from the base station 108. At transmission 506, the base station 108 sends the requested uplink channel quality information to the transmitting UE device 102. Transmission 504 and transmission 506, therefore, are an example of the transmitting UE device 102 obtaining the cellular channel characteristic information. As discussed above, other techniques can be used.

At event 508, the transmitting UE device 102 evaluates the channel quality of the uplink channel and the channel quality of the D2D channel and selects the channel with the better quality. As discussed above, the channel quality indicates the transmission power required to transmit the data through the channel where the channel requiring the least power is selected for transmission. In some situations, the channel quality may indicate the resources required for transmission and the selected communication link is the link requiring the fewest resources. In other situations, the quality indicates a combination of required resources and transmission power and the evaluation takes into account both factors is selecting the preferred communication link.

At transmission 510, the transmitting UE device requests resources for the selected channel. After receiving a grant for the resources from the base station, the transmitting UE device 102 transmits the data though the selected channel.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method comprising:
receiving, at a transmitting user equipment (UE) device from a base station, cellular channel characteristic information indicative of at least a portion of a cellular communication link through the base station and between the transmitting UE device and a receiving UE device;
determining, at the transmitting UE device, device-to-device (D2D) channel characteristic information indicative of a D2D communication link between the transmitting UE device and the receiving UE device; and
selecting, at the transmitting UE device, a transmission link from the cellular communication link and the D2D communication link for transmitting data from the transmitting UE device to the receiving UE device, the selecting based at least in part on the cellular channel characteristic information and the D2D channel characteristic information.

2. The method of claim 1, further comprising transmitting a request for the cellular channel characteristic information.

3. The method of claim 1, wherein the cellular channel characteristic information comprises a channel state information (CSI) report for an uplink portion of the cellular communication link from the transmitting UE device to the base station.

4. The method of claim 1, wherein the determining the cellular channel characteristic information comprises determining the cellular channel characteristic information based on power control information.

5. The method of claim 1, wherein the determining the cellular channel characteristic information comprises evaluating a signal transmitted from the base station over a downlink channel from the base station to the transmitting UE device to determine downlink channel characteristics of the downlink channel and applying reciprocity to determine uplink channel characteristics of an uplink channel from the transmitting UE device to the base station.

6. The method of claim 1, wherein the determining the D2D channel characteristics comprises evaluating a signal transmitted from the receiving UE device and applying reciprocity to determine the D2D channel characteristics.

7. The method of claim 1, wherein the selecting the transmission further based at least in part a minimum quality of service (QoS) for the transmission of the data.

8. The method of claim 1 wherein selecting the transmission link comprises:
determining, from the cellular channel characteristic information, a required cellular transmission power for transmitting data within an uplink channel to the base station;
determining, from the D2D channel characteristic information, a required D2D transmission power for transmitting the data within the D2D transmission channel to the receiving UE device;
selecting the D2D communication link if the D2D transmission power is less than the cellular transmission power; and
selecting the cellular communication link if the D2D transmission power is not less than the cellular transmission power.

9. The method of claim 1 wherein selecting the transmission link comprises:
determining, from the cellular channel characteristic information, required cellular communication resources for transmitting data within an uplink channel to the base station;
determining, from the D2D channel characteristic information, required D2D communication resources for transmitting the data within the D2D transmission channel to the receiving UE device;
selecting the D2D communication link if the required D2D communication resources are less than the required cellular communication resources; and
selecting the cellular communication link if the required D2D communication resources are not less than the required cellular communication resources.

10. A transmitting user equipment (UE) device comprising:
a receiver to receive cellular channel characteristic information from a base station, the cellular channel characteristic information indicative of at least a portion of a cellular communication link through the base station and between the transmitting UE device and a receiving UE device, the receiver to receive a device-to-device (D2D) signal from the receiving UE device over a D2D channel;
a controller to determine, based on the D2D signal, D2D channel characteristic information indicative of a D2D communication link between the transmitting UE device and the receiving UE device, the controller to select a transmission link from the cellular communication link and the D2D communication link for transmitting data from the transmitting UE device to the receiving UE device, the controller selecting the transmission link based at least in part on the cellular channel characteristic information and the D2D channel characteristic information.

11. The transmitting UE device of claim 10, further comprising a transmitter to transmit a request for the cellular channel characteristic information.

12. The transmitting UE device of claim 10, wherein the cellular channel characteristic information comprises a channel state information (CSI) report for an uplink portion of the cellular communication link from the transmitting UE device to the base station.

13. The transmitting UE device of claim 10, wherein the controller selects the transmission link by:
determining, from the cellular channel characteristic information, a required cellular transmission power for transmitting data within an uplink channel to the base station;
determining, from the D2D channel characteristic information, a required D2D transmission power for transmitting the data within the D2D transmission channel to the receiving UE device;
selecting the D2D communication link if the D2D transmission power is less than the cellular transmission power; and
selecting the cellular communication link if the D2D transmission power is not less than the cellular transmission power.

14. The transmitting UE device of claim 10, wherein the controller selects the transmission link by:
determining, from the cellular channel characteristic information, a minimum level quality of service (QoS) available through an uplink channel to the base station;

determining, from the D2D channel characteristic information, a minimum level quality of service (QoS) available through the D2D transmission channel to the receiving UE device; and selecting the D2D communication link based on a minimum level QoS needed for the transmission of the data.

15. A transmitting user equipment (UE) device comprising:

a receiver to receive power control information from a base station and to receive a device-to-device (D2D) signal from a receiving UE device over a D2D channel;

a controller to determine, based on the power control information, cellular channel characteristic information indicative of at least a portion of a cellular communication link through the base station and between the transmitting UE device and a receiving UE device, the controller to determine, based on the D2D signal, D2D channel characteristic information indicative of a D2D communication link between the transmitting UE device and the receiving UE device, the controller to select a transmission link from the cellular communication link and the D2D communication link for transmitting data from the transmitting UE device to the receiving UE device, the controller selecting the transmission link based at least in part on the cellular channel characteristic information and the D2D channel characteristic information.

16. The transmitting UE device of claim 14, wherein the controller selects the transmission link by:

determining, from the cellular channel characteristic information, a required cellular transmission power for transmitting data within an uplink channel to the base station;

determining, from the D2D channel characteristic information, a required D2D transmission power for transmitting the data within the D2D transmission channel to the receiving UE device;

selecting the D2D communication link if the D2D transmission power is less than the cellular transmission power; and selecting the cellular communication link if the D2D transmission power is not less than the cellular transmission power.

* * * * *